3,260,645
RODENTICIDE COMPRISING 3 - [1' - (p - CHLOROPHENYL) - PROPYL] - 4 - HYDROXYCOUMARIN AND β-DIETHYLAMINOETHYL DIPHENYLPROPYLACETATE
Ralph Banziger, Spotswood, and Harold Leon Newmark, Maplewood, N.J., assignors to Hoffmann-La Roche Inc., Nutley, N.J., a corporation of New Jersey
No Drawing. Filed Mar. 11, 1963, Ser. No. 264,078
5 Claims. (Cl. 167—46)

The present invention relates to improved rodenticidal compositions and methods. In particular, the invention relates to a rodenticidal composition suitable for use as a rodenticidal food bait. The composition comprises 3-[1'-(p-chlorophenyl)propyl]-4-hydroxycoumarin in combination with a material that inhibits conjugation and detoxification thereof in the body, the combination being employed in association with other substances of the type specified below. These compositions are characterized by their unique ability to effect high kills of the rodent population in a short period of time.

The rodent problem has been recognized as serious for many years. Rats and mice, for example, are known to consume and ruin large amounts of grain and other food, spread filth and disease, kill chickens, and the like. The United States Government estimates that the rodents' annual board bill runs into hundreds of millions of dollars and that rodents destroy many times what they eat. When one considers that this is only a part of the overall rodent bill paid by the public, along with the estimate that there are many millions of rats and mice in the United States, the magnitude of the problem in this country alone and the attendant need for an effective rodenticide is readily apparent.

There is a special need for a rodenticidal composition effective against the house mouse (Mus musculus) since there is no known rodenticide currently available which has proved itself suitable to adequately control this species of rodent. While certain known rodenticides have achieved a modicum of success in combating the problem caused by rodent infestation, yet these same rodenticides have proved to be ineffective in the ability thereof to reduce the house mouse population in an infested area down to a minimal level. Thus, the house mouse infestation problem is actually more serious than that of rat control due to the lack of an effective control means (although the latter is still of much concern) and the need for an effective rodenticide which can efficaciously solve this acute problem is evident.

While 3 - [1' - (p - chlorophenyl)propyl] - 4 - hydroxycoumarin in association with inert non-lethal ingredients has been recently found to be a highly effective rodent killer; yet in every rodent colony, a small proportion of the members of the said colony are much fitter than the other members of the colony and this small proportion of hardy rodents have the ability to withstand the lethal effects of most rodenticides available. Thus, for a rodenticide to be extremely effective for its intended purpose, it is desirable that the rodenticide function equally well against the most fit members of the rodent colony as well as against its weaker members and accordingly, effect substantially 100 percent kills of the members of the rodent colony in a relatively short period of time.

Thus, one of the objects of the present invention is to provide an improved rodenticide which is effective in achieving extremely high kills of the rodent population.

Another object of the present invention is to provide an improved rodenticide which is extremely effective against all forms of rodents and, in particular, against house mice.

In achieving this objective within the purview of the present invention, it has been found that if a minor amount of 3-['-(p-chlorophenyl)propyl]-4-hydroxycoumarin is employed in admixture with a minor amount of a material that inhibits conjugation and detoxification thereof in the body, and inert non-lethal substances, in a rodenticidal sense, such as white oil, breakfast oats, yellow corn meal, and mixtures of such substances, a highly effective rodent killer is devised which works with equal efficacy against all members of the rodent colony.

The combination of 3-[1'-(p-chlorophenyl)propyl]-4-hydroxycoumarin and a material that inhibits conjugation and detoxification thereof in the body, function synergistically to bring about higher kills of the rodent population than is possible with either member of the combination alone. Representative of materials that inhibits conjugation and detoxification of 3-[1'-(p-chlorophenyl)propyl]-4-hydroxycourmarin in the body suitable for the present purposes is β-diethylaminoethyl diphenylpropylacetate. This combination of the two materials have been found to be particularly effective against the fittest members of the rodent colony, i.e. those which have the ability to ingest various forms of presently available rodenticidal compositions and yet recover from any effects which such rodenticidal compositions might exert thereon.

In one aspect, the combination including 3-[1'(p-chlorophenyl)propyl]-4-hydroxycoumarin and a material that inhibits conjugation and detoxification thereof in the body (i.e. a potentiator of 3-[1'-(p-chlorophenyl)propyl]-4-hydroxycoumarin) is produced as a concentrate comprising essentially from about 0.3 to about 5 parts by weight of the active lethal ingredient, namely, 3-[1'-(p-chlorophenyl)propyl]-4-hydroxycoumarin, from about 0.03 to about 5 parts by weight of a potentiator of the lethal ingredient which can be β-diethylaminoethyl diphenylpropylacetate and the remainder per 100 parts by weight of the concentrate being a non-nutrient inert non-lethal diluent or carrier material which can be talc, clay, kieselguhr, silicic acid and the like, a nutrient non-lethal diluent such as corn starch or mixtures of such inert non-lethal ingredients. The concentrate can be put into commercial channels as such (generally for professional use) or can be mixed with a suitable amount of a food stuff or a mixture of food stuffs to provide a composition which is relatively safe and adaptable for use by the public at large as distinguished from professional exterminators.

The concentrate can be prepared by blending in any suitable means all the material that comprises the concentrate. Thus, the inert non-lethal diluent or carrier material, the potentiator and the active lethal ingredient can be added simultaneously to a mixing means such as a twin shell mixer, a drum mixer, or the like and blended therein.

Alternatively, the active lethal ingredient and inert non-lethal carrier material such as silicic acid, talc, clay and the like can be blended and thereafter the resultant blend can be mixed with the potentiator and any of the other inert diluent or carrier materials which make up the concentrate.

In another procedure, the concentrate can be derived by mixing the active lethal ingredient, namely, 3-[1'-(p-chlorophenyl)propyl]-4-hydroxycoumarin and an inert diluent such as talc, clay, silicic acid, kieselguhr and the like in a suitable blender. The potentiator, namely, β-diethylaminoethyl diphenylpropylacetate or the like is added to the resultant mixture with mixing. Then, the concentrate is finally prepared by mixing the resultant blend with further inert diluents such as corn starch.

In an alternative aspect, 3-[1'-(p-chlorophenyl)propyl]-4-hydroxycoumarin can comprise a part of a food bait ready for unmodified use, particularly by the general public, as distinguished from professional exterminators.

Such food bait can be prepared in one embodiment by mixing the concentrate with a suitable amount of a food stuff or a mixture of such food stuffs to provide the desired bait containing from about 0.005 to about 0.1 percent by weight of 3-[1'-(p-chlorophenyl)propyl]-4-hydroxycoumarin. For example, when 19 parts of food stuffs, such as oats, corn meal or mixtures thereof, are mixed with 1 part of the concentrate containing 0.05 parts by weight of the active ingredient, there is provided a bait containing 0.025 percent by weight of 3-[1'-(p-chlorophenyl)propyl]-4-hydroxycoumarin.

In an alternate embodiment, the finished bait can be made by mixing from about 99.80 parts to about 99.9943 parts of a food stuff, preferably an edible ingredient such as oats, corn meal or mixtures thereof with from about 0.005 to about 0.1 part by weight, more preferably from about 0.01 part to about 0.025 part by weight of 3-[1'-(p-chlorophenyl)propyl]-4-hydroxycoumarin and from about 0.0007 to about 0.1, more preferably from about 0.0012 to about 0.05 part by weight of β-diethylaminoethyl diphenylpropylacetate. It is also possible to incorporate the active lethal ingredient and the potentiator or the concentrate per se by suitable means in any conveniently available food stuffs such as bread, fish, meat, flour and the like. Compositions of this type have proved outstanding as food baits.

The active lethal ingredient is intimately mixed and milled with the other non-lethal componennts of the composition and thereafter may be strewn in areas where the rodents are known to be living. Accordingly, the animals come into close contact with the effective compositions and when they feed, the rodenticidal food bait is eaten, thereby causing the death of such animals.

Of special advantage, furthermore, is the fact that the compositions of the present invention contain only a very small amount of the active lethal ingredient, thereby substantially lessening the happenstance of damage to larger animals such as cats, dogs, farm animals and the like, as well as to man.

Of further advantage, is the unique ability of the rodenticide of the present invention to serve as an all purpose rodenticide, i.e. a rodenticide that is as equally effective against the house mouse as it is against other rodent species.

The mixing of the various constituents which make up the composition can be efficaciously effected by any convenient means. For instance, the active lethal ingredient, i.e. 3 - [1' - (p - chlorophenyl)propyl] - 4 - hydroxycoumarin and its potentiator and the remaining non-lethal constituents of the composition, such as powdered sugar, corn meal and/or cereal oats, the inert carriers or diluents, and the like can be fed dry to any conventional blender or tumbling means, e.g. a drum mixer, a twin shell mixer and the like, and tumbled therein whereby to form a satisfactory blend of the various components of the composition. Preferably, the non-lethal ingredients are in flaky or granular form and the lethal ingredient is finely divided whereby by blending in the manner suggested above a dispersion of the lethal ingredient on the granules or the flakes result.

In another aspect, the active lethal ingredient, the potentiator and the remaining components of the composition can be fed dry into any conventional pelleting apparatus, e.g. a "Sprout-Waldron" pelleting machine. The mixture is contacted with steam and compressed in a conventional manner to pellets of any desired shape. It is preferable that the pellets be sufficiently small whereby they are entirely consumed by the rodent during feeding, but such is not absolutely necessary. Preferably the pellets should weigh between from about 0.5 g. to about 10 g.

In another aspect, conventional pellet type or powder type, commercially available, animal feed is spray-coated with a mixture of finely divided 3-[1'-(p-chlorophenyl)propyl]-4-hydroxycoumarin, finely divided β-diethylaminoethyl diphenylpropylacetate and vegetable or white mineral oil to yield a finished bait suitable for use for the intended purpose.

As is evident from the above, the rodenticidal food bait, when strewn in an area where rodents are known to be living, can take any conventional form. For example, the rodenticidal food bait can be utilized in the form of a powder, granules, flakes or as a pellet possessing various shapes but preferably so sized as to be entirely consumed by the rodent during feeding.

The compositions of the present invention can further contain other ingredients such as rodent attractants, masking ingredients, other substances which render the 3-[1'-(p-chlorophenyl)propyl]-4-hydroxycoumarin more lethal, coloring materials and the like.

The following examples will serve to illustrate the present invention but are not limitative thereof.

EXAMPLE 1

The following formulation was prepared by intimately mixing the various ingredients, while dry, in a conventional twin shell blender for a period of one hour.

*Formula I*

| Ingredients: | Percent |
|---|---|
| 3 - [1' -( p - chlorophenyl)propyl] - 4 - hydroxycoumarin | 0.005 |
| Liquid petrolatum | 4.8 |
| Sucrose | 4.8 |
| β - Diethylaminoethyl diphenylpropylacetate | 0.0007 |
| Breakfast rolled oats | Remainder |

Two groups of CFW mice of both sexes weighing 18 to 22 g. were given the above formula once daily for three consecutive days. The animals were observed for 10 days for mortality. The composition of Formula I was found to be a highly effective rodenticide.

EXAMPLE 2

The following formulation was prepared by intimately mixing the various ingredients, while dry, in a conventional drum mixer for a period of one hour.

| Ingredients: | Percent |
|---|---|
| 3 - [1' - (p - chlorophenyl)propyl] - 4 - hydroxycoumarin | 0.01 |
| Liquid petrolatum | 4.8 |
| Sucrose | 4.8 |
| β - diethylaminoethyl diphenylpropylacetate | 0.0012 |
| Breakfast rolled oats | Remainder |

EXAMPLE 3

A composition was prepared containing .025 percent by weight of 3-[1'-(p-chlorophenyl)propyl]-4-hydroxycoumarin, 0.003 percent by weight of β-diethylaminoethyl diphenylpropylacetate and 99.972 percent of a mixture prepared from 5 parts of rolled oats (breakfast type), 13 parts of yellow corn meal, 1 part of powdered sugar and 1 part of vegetable oil. The rodenticide bait was found to effect high kills in rats and mice within a few days.

We claim:

1. A composition suitable for use as a rodenticide comprising essentially from about 0.005 percent to about 0.1 percent by weight of 3-[1'-(p-chlorophenyl)propyl]-4-hydroxycoumarin, from about 0.0007 to about 0.1 percent by weight of β-diethylaminoethyl diphenylpropylacetate and from about 99.9943 percent to about 99.8 percent by weight of inert non-lethal ingredients.

2. A composition suitable for use as a rodenticide consisting essentially of from about 0.01 percent to about 0.025 percent by weight of 3-[1'-(p-chlorophenyl)propyl]-4-hydroxycoumarine, from about 0.0012 to about 0.05 percent by weight of β-diethylaminoethyl diphenylpropylacetate and the remainder by weight being inert non-lethal ingredients.

3. A method of alleviating a rodent problem caused by rodent infestation which comprises positioning, in an area where rodents assemble, a rodenticide composition consisting essentially of from about 0.005 percent to about 0.1 percent by weight of 3-[1'-(p-chlorophenyl)propyl]-4-hydroxycoumarin, from about 0.0007 to about 0.1 percent by weight of β-diethylaminoethyl diphenylpropylacetate and the remainder by weight being inert non-lethal ingredients.

4. A concentrate suitable for use as a rodenticide consisting essentially of from about 0.3 percent by weight to about 5 percent by weight of 3-[1'-(p-chlorophenyl)propyl]-4-hydrocoumarin, from about 0.03 to about 5 percent by weight of β-diethylaminoethyl diphenylpropylacetate, the remainder being inert ingredients.

5. A method of forming a pellet suitable for use as a rodenticidal food bait which comprises spray-coating an edible food pellet with from about 0.005 to about 0.1 weight percent based on the weight of the first-mentioned pellet of 3-[1'-(p-chlorophenyl)propyl]-4-hydroxycoumarin and from about 0.0007 to about 0.1 weight percent based on the weight of the first-mentioned pellet of β-diethylaminoethyl diphenylpropylacetate.

References Cited by the Examiner
UNITED STATES PATENTS 2,952,689  9/1960  Enders et al. _____ 167—46

JULIAN S. LEVITT, *Primary Examiner.*

D. B. MOYER, *Assistant Examiner.*